United States Patent
Watts

(10) Patent No.: US 9,010,376 B2
(45) Date of Patent: Apr. 21, 2015

(54) APPARATUS FOR A PNEUMATIC RELAY VENTING PRESSURE DYNAMIC FEEDBACK COMPENSATOR

(71) Applicant: Dresser, Inc., Addison, TX (US)

(72) Inventor: Hal G. Watts, East Falmouth, MA (US)

(73) Assignee: Dresser, Inc., Addison, TX (US)

( * ) Notice: Subject to any disclaimer, the term of this patent is extended or adjusted under 35 U.S.C. 154(b) by 85 days.

(21) Appl. No.: 13/665,326

(22) Filed: Oct. 31, 2012

(65) Prior Publication Data

US 2013/0105714 A1    May 2, 2013

Related U.S. Application Data

(60) Provisional application No. 61/553,838, filed on Oct. 31, 2011.

(51) Int. Cl.
| | | |
|---|---|---|
| F16K 11/074 | (2006.01) | |
| F16K 11/07 | (2006.01) | |
| F15B 13/04 | (2006.01) | |
| F15B 13/042 | (2006.01) | |
| G05D 16/18 | (2006.01) | |

(52) U.S. Cl.
CPC ........... *F15B 13/0405* (2013.01); *F15B 13/042* (2013.01); *G05D 16/18* (2013.01)

(58) Field of Classification Search
USPC ............... 137/625.2, 625.26, 625.66, 601.18, 137/601.19
See application file for complete search history.

(56) References Cited

U.S. PATENT DOCUMENTS

| | | | | |
|---|---|---|---|---|
| 3,286,731 A * | 11/1966 | Zajac | .................. | 137/601.05 |
| 4,289,126 A * | 9/1981 | Seireg et al. | ............. | 128/204.24 |
| 6,272,401 B1 * | 8/2001 | Boger et al. | .................. | 700/282 |
| 6,917,858 B2 * | 7/2005 | Boger | ............................ | 700/282 |
| 6,957,127 B1 * | 10/2005 | Smart et al. | ................... | 700/289 |

* cited by examiner

*Primary Examiner* — John Rivell
*Assistant Examiner* — Kevin Barss
(74) *Attorney, Agent, or Firm* — Paul, Frank + Collins PC

(57) ABSTRACT

A relay includes a balance plug, a vent passage, and a flow passage. The first passage fluidly coupled to the balance plug and the vent passage.

14 Claims, 4 Drawing Sheets

… (1)

APPARATUS FOR A PNEUMATIC RELAY VENTING PRESSURE DYNAMIC FEEDBACK COMPENSATOR

CROSS-REFERENCE TO RELATED APPLICATIONS

This application claims priority to U.S. Provisional Patent Application No. 61/553,838, filed Oct. 31, 2011.

TECHNICAL FIELD

Embodiments of the present invention generally relate to pneumatic relay valve position systems; and, more particularly, to feedback compensators for use in association with dynamically balanced current-to-pneumatic converter and amplifier systems.

BACKGROUND OF THE INVENTION

Current-to-pneumatic converter and amplifier systems produce a pneumatic pressure proportional to a given electrical current. This produced pneumatic pressure may be referred to as a signal pressure. The signal pressure may be amplified, both in pressure and volume, and fed to a pneumatic actuator used to position a valve in a valve positioner system. Such a system is described in U.S. Pat. No. 6,957,127, issued Oct. 18, 2005.

In a typical two-stage valve positioner, the second stage is used to amplify both the flow capacity and pressure range of the output since a typical current-to-pneumatic converter may have a low flow and minimal pressure gain. Pneumatic control valve positioner manufacturers have traditionally used two types of pneumatic amplifiers. One type is a spool valve design. The second type is a pneumatic relay, which may be called a relay. A pneumatic relay is a pneumatic amplifier that converts a small pneumatic input pressure signal into a larger pneumatic output signal comprising both pressure and flow. Pneumatic relays are used to supply pressurized air to a pneumatic valve actuator, such as a piston, to position or throttle a valve.

Inherent to the design of the relay is an end-loading of a supply plug on a corresponding supply seat during steady state operation of the relay. This end-loading is due to the pressure drop across the plug and the force due to a supply plug spring. During dynamic response of the relay, signal pressure must be increased sufficiently to overcome this end-loading before any additional output flow is established. This change in signal pressure with no corresponding output flow is referred to as a flow deadband. Elevated venting back pressure has been known to force open the supply plug, allowing supply pressure to flow into the vent area, which, in turn, can significantly increase venting time.

BRIEF DESCRIPTION OF THE INVENTION

Disclosed herein are systems and apparatuses for a venting pressure feedback compensator for use in a device, such as an electro-pneumatic positioner. In an embodiment, a balance plug, a vent passage, and a flow passage fluidly coupled with the balance plug and the vent passage. Embodiments of the invention address at least the long-standing problem identified above, namely excessive vent times under conditions wherein venting pressures have become elevated.

In an embodiment, a balance plug, a vent passage, and a flow passage fluidly coupled with an output face of the balance plug and the vent flow passage. In another embodiment, a feedback compensator for a relay may be produced by a process comprising: fluidly coupling a flow passage with a vent passage, wherein a balance plug is fluidly coupled with the flow passage and wherein the flow passage is configured to reduce a net force that the balance plug exerts onto the supply plug, thus, maintaining a positive force on the supply plug to keep the supply plug closed during a venting state.

BRIEF DESCRIPTION OF THE DRAWINGS

A more detailed understanding may be had from the following description, given by way of example in conjunction with the accompanying drawings wherein.

DETAILED DESCRIPTION OF THE INVENTION

As described herein, in an embodiment a relay amplifier (hereinafter "relay") may comprise a pneumatic relay venting pressure dynamic feedback compensator (hereinafter feedback compensator), which may include a flow passage having a first end and a second end. The first end of the flow passage is fluidly coupled with a balance plug, and the second end of the flow passage is fluidly coupled with a vent passage. The feedback compensator functions to equalize pressure and maintain a positive force on a supply plug to keep the supply plug closed during a venting state.

Figure 1:
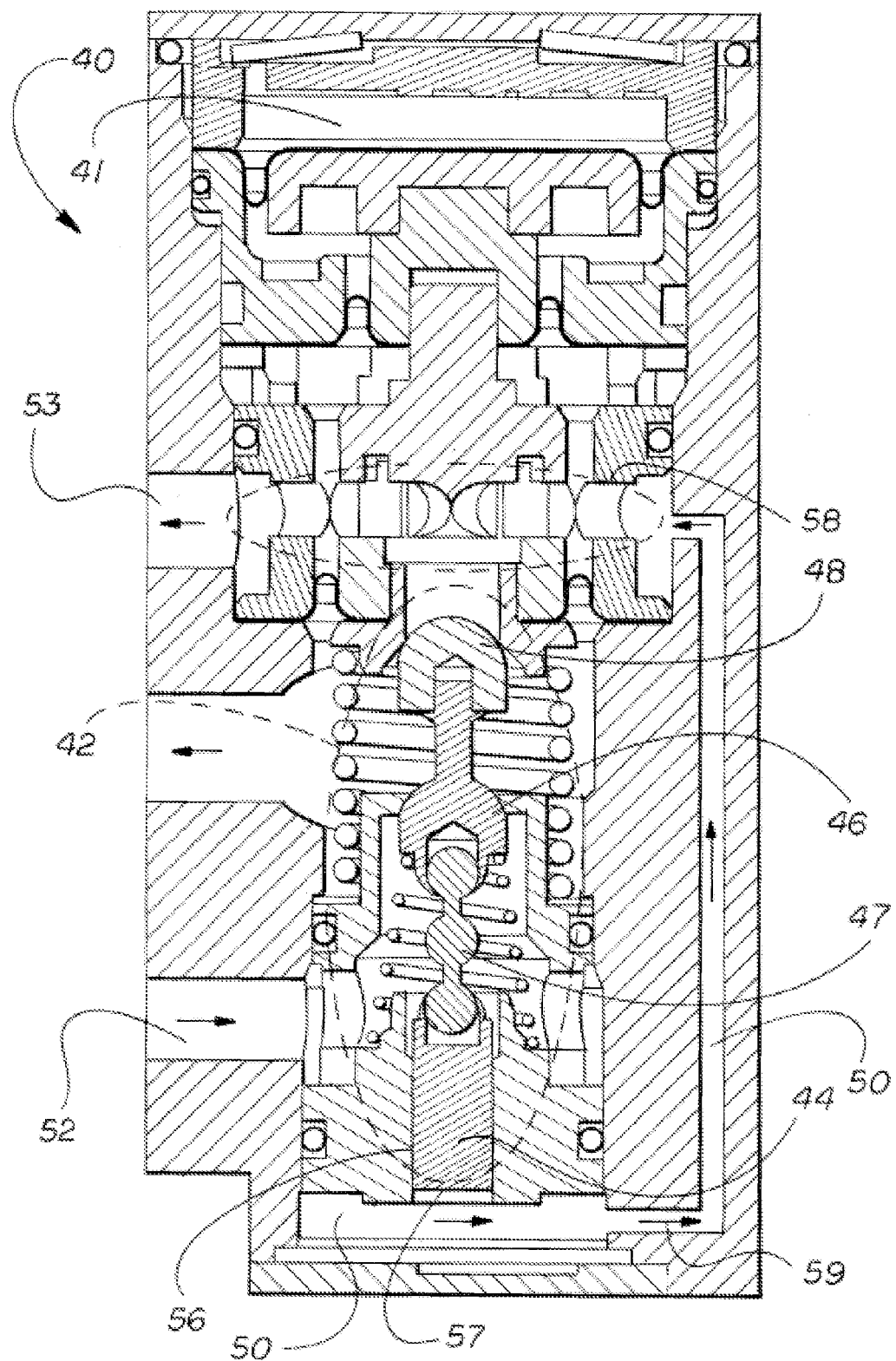
FIG. 1 illustrates a sectional view of a relay having a pneumatic relay venting pressure dynamic feedback compensator used in a valve positioner system in a steady state according to one embodiment of the present disclosure.

FIG. 1 illustrates a steady state condition of relay 40 having a feedback compensator 50 used in a valve positioner system according to one embodiment of the present disclosure. A sectional view of relay amplifier 40 (also called a "relay") used in a valve positioner system is shown in FIG. 1. Plug assembly 42 of relay 40 may balance input and output pressures, in order to minimize flow deadband. Flow deadband may cause a condition wherein the signal pressure 41 to relay 40 may change with no corresponding relay output flow change. Plug assembly 42 may comprise vent plug 48, which is connected to supply plug having a first end and a second end. In this embodiment, supply plug 46 is connected via a bead chain 47 to balance plug 44. Balance plug 44 is a piston assembly designed to minimize the effects of supply pressure on movement of the supply plug 46. Balance plug 44 is designed to assist in balancing the pressure forces on supply plug 46.

Balance plug 44 may be coupled with the supply plug 46 with a bead chain 47. Supply plug 46 has a first end coupled with the bead chain 47, and a second end coupled with the vent plug 48. The vent plug 48 is coupled with the vent passage 53. Bead chain 47 provides for a secure attachment while providing minimal opportunity for side loading of balance plug 44. Side loading may add additional undesirable deadband due to friction created in the assembly. Since the deadband is caused by forces deriving from end-loading, and the end-load is a function of supply pressure, the addition of balance plug 44 adds a force, which is also a function of the supply pressure, to oppose forces from end-loading Balance plug 44 has an output face 57 that may be fluidly connected to (or interact with) feedback compensator 50. Feedback compensator 50 may be fluidly connected to vent plug 48 and vent passage 53. A flow may flow over or otherwise interact with vent plug 48 and the flow may flow out of vent passage 53. In the area of ellipse 58 of FIG. 1 there may be several different components and passages that allow for the fluid connectivity of feedback compensator 50 to vent passage 53 and vent plug 48.

The input pressure in passage 52 may be fixed at a house pressure (e.g., 100 PSI). In an embodiment, balance plug 44 may be designed for a tight precision fit that is configured in a way to minimize friction and allow movement of balance plug 44. This design may allow the air that flows through the input passage 52 to leak into feedback compensator 50, near edge 56 of balance plug 44 for example as shown in FIG. 1, and out vent passage 53. Directional arrows in feedback compensator 50, such as directional arrow 59, show the direction of the movement of the flow.

Figure 2:
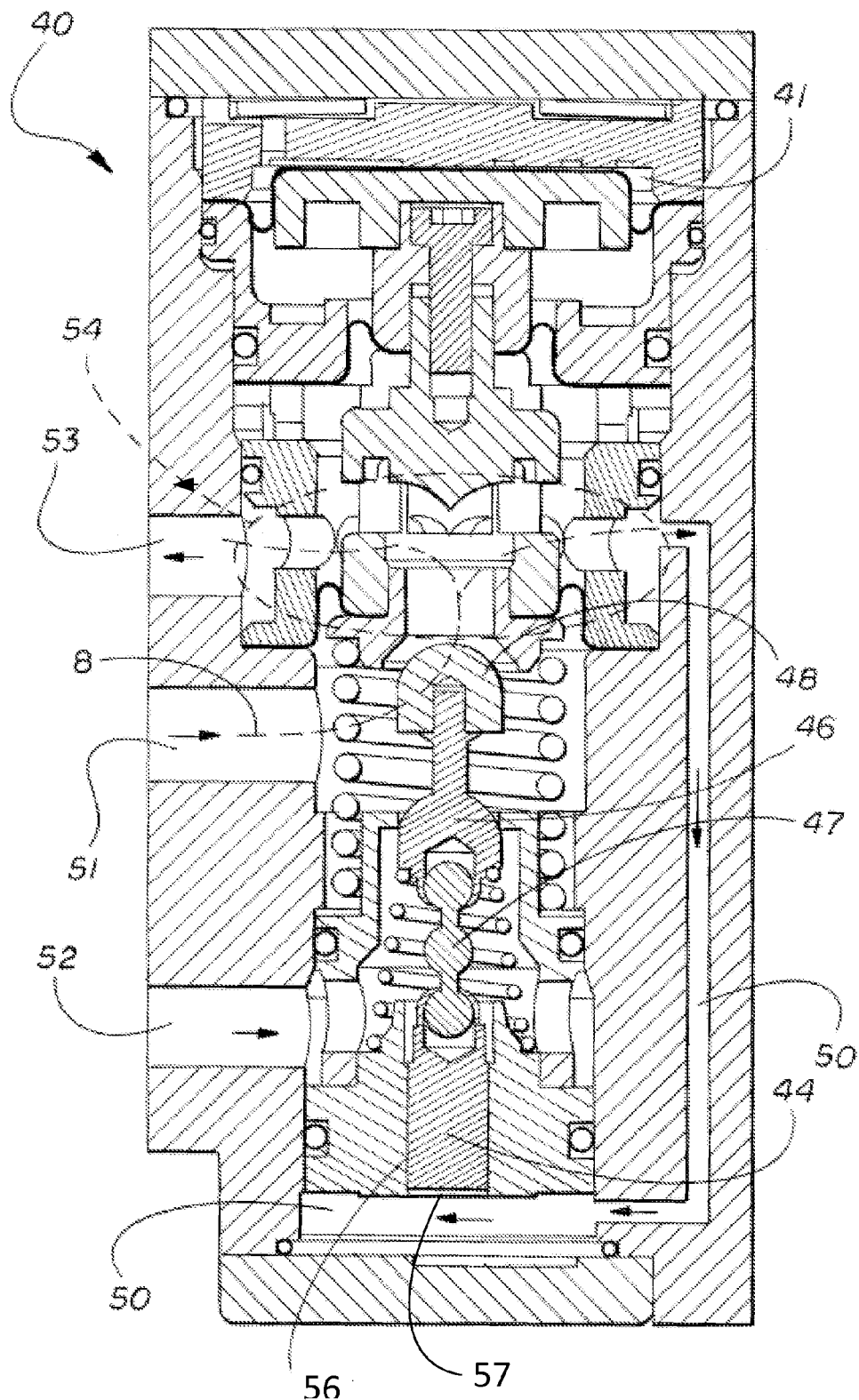
FIG. 2 illustrates a sectional view of a relay having a pneumatic relay venting pressure dynamic feedback compensator used in a valve positioner system in a venting state according to one embodiment of the present disclosure.

FIG. 2 displays relay 40 in a venting state. Venting may be described as the state wherein relay 40 operates to relieve pressure in the pneumatic actuator (not shown) to open or close a valve (not shown). The actuator (not shown) may be fluidly connected to output pressure 51.

In the vent state, as shown in FIG. 2, supply plug 46 may be closed and the vent plug 48 opened, allowing air from the actuator, via the output pressure passage 51, to flow to the outside (via vent passage 53); thus, reducing the pressure inside the actuator. During venting from high output pressures, a back pressure, generally in the area as indicated by ellipse 54, may build up inside the venting area of relay 40. This back pressure acts on the vent plug 48 which in turn may also open the supply plug 46.

To help counteract such undesired back pressure force, feedback compensator 50 is positioned in the pathway of the venting air stream. Feedback compensator 50 fluidly couples the balance plug output face 57 with the relay vent passage 53. As explained above, the feedback compensator 50 is a flow passage having a first end fluidly coupled with the balance plug output and second end fluidly coupled with the vent passage 53. Feedback compensator 50 may be designed in a manner that allows the flow of the venting air stream to naturally travel a path of least resistance. As shown in FIG. 2 via dotted line 8 and other directional arrows, the flow of the venting air stream may travel around the balance plug 48 into the vent passage 53, as well as through the feedback compensator 50 to counteract undesired backpressure.

By fluidly coupling the balance plug output face 57 to the vent passage 53, the pressure may be approximately the same in both areas. Therefore during the state of venting, when the back pressure increases, this same pressure increase may act upon the output of the balance portion of balance plug 44. This increase in pressure may serve to reduce the net force that balance plug 44 exerts onto supply plug 46, therefore maintaining a positive force on supply plug 46 to keep supply plug 46 closed during the venting state.

Without the feedback compensator 50, the net force on supply plug 46 may become less than the resulting force applied on supply plug 46 from the back pressure 54 or other pressures during venting, thus forcing supply plug 46 open. It may increase the time to reduce the pressure inside the actuator to the desired level, when the supply plug 46 is open during the venting state. As described above, and advantageously, by connecting these two areas and equalizing the pressure therebetween, a positive force is maintained on supply plug 46 to keep supply plug 46 closed during the venting state and reducing the venting state cycle time.

Figure 3:
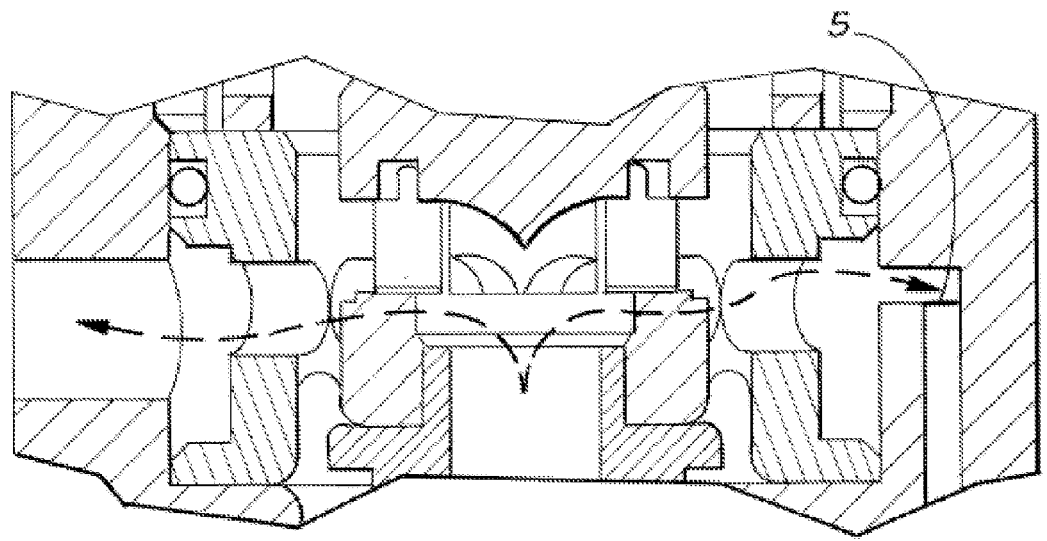
FIG. 3 illustrates a portion of a sectional view of a relay of a feedback compensator with a gate, the feedback compensator used in a valve positioner system in a venting state according to one embodiment of the present disclosure.
Figure 4:
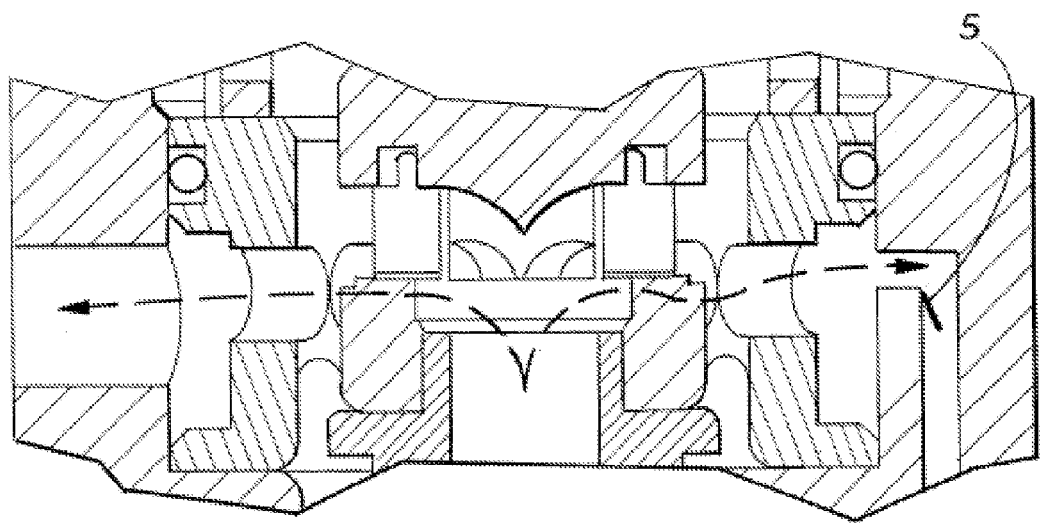
FIG. 4 illustrates a portion of a sectional view of a relay of a feedback compensator with an open gate, the feedback compensator used in a valve positioner system in a venting state according to one embodiment of the present disclosure.

Turning now to FIGS. 3 and 4, different mechanical or electromechanical devices (e.g., a pump or gate) may be used to relieve undesired backpressure. Electromechanical devices may be defined as devices that carry out electrical operations by using moving parts. In an embodiment, the feedback compensator 50 may be left in a closed or off state and may be activated when a pressure reaches a certain threshold level (e.g., 30 PSI). FIGS. 3 and 4 illustrate a portion of a sectional view of a relay of a feedback compensator used in a valve positioner system in a venting state according to one embodiment of the present disclosure, similar to FIG. 2. A gate 5 may be in an open or closed position, as shown in FIG. 3 and FIG. 4, respectively. Gate 5 may be configured in a manner so that it opens as a result of meeting a threshold pressure applied to gate 5 and may close based on a different pressure that doesn't meet the threshold. In an embodiment, pressure buildup of a flow of a back pressure to a certain level may naturally push on gate 5 and activate the feedback compensator 50.

Figure 5:
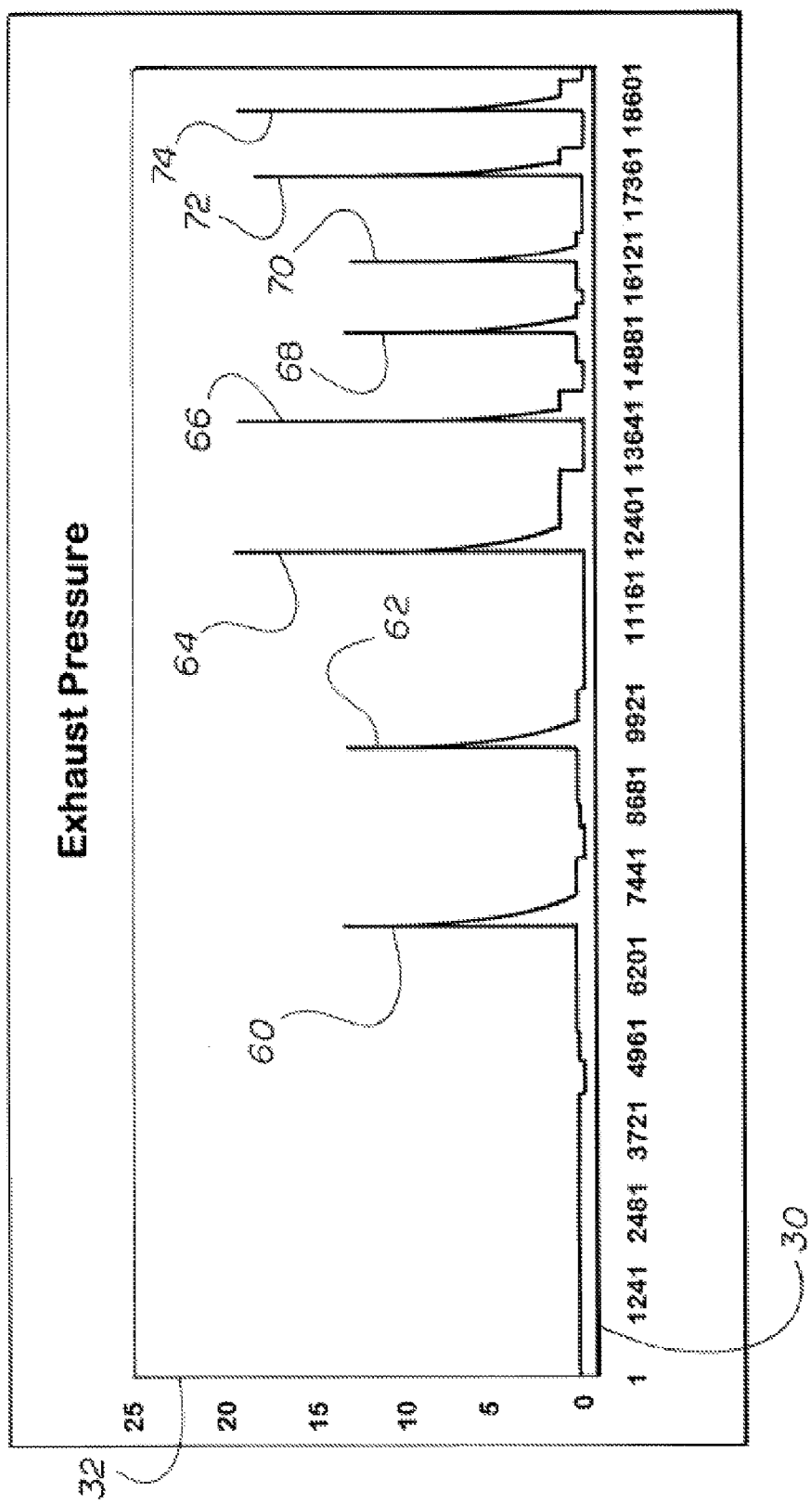
FIG. 5 illustrates representative test data obtained from a relay having a pneumatic relay venting pressure dynamic feedback compensator according to one embodiment of the present disclosure.

FIG. 5 displays test data obtained from a relay having a feedback compensator 50 according to one embodiment of the present disclosure. FIG. 5 demonstrates eight venting cycles shown in a plot of exhaust pressure on the y-axis 32 over time on the x-axis 30. Pressure is in psi. Time is in 10 millisecond increments. For purposes of this test, a number 23 actuator was used with 6-30 springs. Supply pressure was set to 90 psi.

In FIG. 5, feedback compensator 50 was set to the following states:
  Cycle 60—Compensator "on"
  Cycle 62—Compensator "on"
  Cycle 64—Compensator "off"
  Cycle 66—Compensator "off"
  Cycle 68—Compensator "on"
  Cycle 70—Compensator "on"
  Cycle 72—Compensator "off"
  Cycle 74—Compensator "off"

As can be observed in FIG. 5, for the cycles with feedback compensator 50 set to on (i.e., a flow connection from balance plug 44 to vent area 53) the average venting time is reduced in comparison to the cycles wherein the feedback compensator 50 was set to off (i.e., no flow connection from balance plug 44 to vent area 53). Venting time, as shown in FIG. 5, may be considered the time for the actuator to "vent" pressurization to a steady state pressure, here approximately 0 PSI.

Testing of a plurality of embodiments have determined that devices and systems in accordance with the present disclosure may beneficially reduce the amount of force on the balance plug 44 during the state of venting. This reduction in balance plug 44 force may help keep the supply plug 46 closed during venting. With feedback compensator 50, the number of boosters required within a system, along with associated piping, skilled labor set-up time, and the like, may be reduced or eliminated. In an embodiment, feedback compensator 50 may be used in an electro-pneumatic positioner that operates with supply pressures between approximately 20 psi and 150 psi.

Devices and systems in accordance with the present disclosure may also help installations that require the vent exhaust to be piped away from the valve. By decreasing vent back pressure sensitivity, venting speeds may be increased. Devices and systems in accordance with the present disclosure may also allow capture of balance plug output into vent exhaust piping, if so equipped.

Consistent dynamic response with minimal effect on the manufacturability or its steady state performance may occur through use of a feedback compensator 50. Air, gas, and liquid flows are contemplated herein.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims. As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

What is claimed:

1. A relay device, comprising:
   an inlet passage;
   an outlet passage spaced apart from the inlet passage;
   a first flow passage fluidly coupled to the inlet passage and the outlet passage;
   a plug assembly disposed in the first fluid passage, the plug assembly configured to regulate flow of fluid between the inlet passage and the outlet passage; and
   a second flow passage configured to direct fluid flow around the plug assembly between the inlet passage and the outlet passage,
   wherein the plug assembly comprises a first plug, a second plug, and a third plug coupled therebetween, wherein the first plug and the second plug are disposed near, respectively, the inlet passage and the outlet passage, and wherein the second flow passage has a first end proximate the first plug and a second end proximate the second plug.

2. The relay device of claim 1, wherein the third plug has a first end and a second end, and wherein the first end of the third plug is coupled with the second plug by a bead chain.

3. The relay device of claim 1, wherein the second flow passage is configured to reduce a net force that the second plug exerts onto the third plug to maintain a positive force on the third plug to keep the third plug closed during a venting state.

4. The relay device of claim 1, further comprising a mechanical device having a first position and a second position that configure the mechanical device to, respectively, permit flow through the flow passage and to prevent flow through the flow passage, respectively.

5. The relay device of claim 1, further comprising an electromechanical device having a first state and a second state that configure the electromechanical device to, respectively, permit flow through the flow passage and the prevent flow through the flow passage, respectively.

6. The relay device of claim 1, wherein the second flow passage has a mechanical device positioned therein to configure the second flow passage to direct fluid flow through the second flow passage.

7. The relay device of claim 1, wherein the second flow passage has an electromechanical device positioned therein to configure the second flow passage to direct fluid flow through the second flow passage.

8. The relay device of claim 1, wherein the second flow passage is configured to balance pressure between a first side of the plug assembly near the first plug and a second side of the plug assembly near the second plug.

9. A relay device, comprising:
   an inlet passage;
   an outlet passage spaced apart from the inlet passage;
   a first flow passage fluidly coupled to the inlet passage and the outlet passage;
   a plug assembly disposed in the first fluid passage, the plug assembly configured to regulate flow of fluid between the inlet passage and the outlet passage;
   a second flow passage configured to direct fluid flow around the plug assembly between the inlet passage and the outlet passage; and
   a gate disposed in the second fluid passage, wherein the gate is configured to open in response to a threshold pressure to allow fluid flow through the second flow passage.

10. The relay device of claim 9, wherein the second flow passage is configured to reduce back pressure on the plug assembly near the outlet passage.

11. The relay device of claim 9, wherein the plug assembly comprises a first plug and a second plug, wherein the first plug and the second plug are disposed near, respectively, the inlet passage and the outlet passage, and wherein the second flow passage has a first end proximate the first plug and a second end proximate the second plug.

12. The relay device of claim 11, wherein the plug assembly comprises a third plug, wherein the third plug has a first end and a second end, and wherein the first end is coupled with the second plug and the second end is coupled with the first plug.

13. The relay device of claim 12, further comprising a bead chain, wherein the first end of the third plug is coupled with the bead chain.

14. The relay device of claim 12, wherein the second flow passage is configured to reduce a net force that the second plug exerts onto the first plug to maintain a positive force on the third plug to keep the third plug closed during a venting state.

* * * * *